US009322283B2

(12) United States Patent
Parkin et al.

(10) Patent No.: US 9,322,283 B2
(45) Date of Patent: Apr. 26, 2016

(54) AIRFOIL WITH GALVANIC CORROSION PREVENTIVE SHIM

(71) Applicant: United Technologies Corporation, Hartford, CT (US)

(72) Inventors: Michael Parkin, South Glastonbury, CT (US); Mark Quinn, Wethersfield, CT (US); Leland Wiegman, Williamston, MI (US); Brandon A. Gates, DeWitt, MI (US)

(73) Assignee: United Technologies Corporation, Hartford, CT (US)

( * ) Notice: Subject to any disclaimer, the term of this patent is extended or adjusted under 35 U.S.C. 154(b) by 854 days.

(21) Appl. No.: 13/630,822

(22) Filed: Sep. 28, 2012

(65) Prior Publication Data
US 2014/0093367 A1   Apr. 3, 2014

(51) Int. Cl.
F01D 5/28    (2006.01)
F01D 5/14    (2006.01)
F04D 29/32   (2006.01)

(52) U.S. Cl.
CPC ............. *F01D 5/28* (2013.01); *F04D 29/324* (2013.01); *F05D 2220/36* (2013.01); *F05D 2240/303* (2013.01); *F05D 2300/603* (2013.01); *Y02T 50/672* (2013.01)

(58) Field of Classification Search
CPC . F04D 29/324; F04D 29/388; F05B 2230/90; F05D 2220/36; F05D 2240/303
See application file for complete search history.

(56) References Cited

U.S. PATENT DOCUMENTS

| | | | |
|---|---|---|---|
| 3,813,186 A | 5/1974 | Palachek et al. | |
| 4,264,278 A | 4/1981 | Weingart | |
| 4,648,921 A | 3/1987 | Nutter, Jr. | |
| 4,789,304 A | 12/1988 | Gustafson et al. | |
| 4,842,663 A * | 6/1989 | Kramer | B23P 6/005 156/153 |
| 5,110,260 A | 5/1992 | Byrnes et al. | |
| 5,222,297 A | 6/1993 | Graff et al. | |
| 5,375,978 A | 12/1994 | Evans et al. | |
| 5,486,096 A * | 1/1996 | Hertel | B64C 27/46 156/313 |
| 6,004,101 A | 12/1999 | Schilling et al. | |
| 7,429,165 B2 * | 9/2008 | Burdgick | F01D 5/282 416/229 A |
| 7,753,653 B2 | 7/2010 | Cairo et al. | |
| 8,721,294 B2 * | 5/2014 | Watson | F01D 5/288 416/241 A |
| 2005/0082699 A1 | 4/2005 | Dixon | |
| 2008/0124512 A1 | 5/2008 | Steibel et al. | |
| 2008/0170943 A1 | 7/2008 | Cairo et al. | |
| 2011/0211967 A1 | 9/2011 | Deal et al. | |
| 2012/0152893 A1 | 6/2012 | Parkos et al. | |

OTHER PUBLICATIONS

International Search Report and the Written Opinion from PCT Application Serial No. PCT/US2013/061892; dated Dec. 19, 2013, 12 pages.

* cited by examiner

*Primary Examiner* — Nathaniel Wiehe
*Assistant Examiner* — Jason Davis
(74) *Attorney, Agent, or Firm* — Kinney & Lange, P.A.

(57) ABSTRACT

An airfoil includes an airfoil body made of a first metal with a leading edge, a trailing edge, pressure side and suction side; a sheath with first and second flanks made of a second metal; a first layer of non-conductive material adhesively bonded between a portion of the end of the first flank and the airfoil body and extending beyond the end of the first flank on the pressure side; and a second layer of non-conductive material adhesively between a portion of the end of the second flank and the airfoil body and extending beyond the end of the second flank on the suction side.

20 Claims, 3 Drawing Sheets

AIRFOIL WITH GALVANIC CORROSION PREVENTIVE SHIM

BACKGROUND

Titanium alloys and fiber composites are the benchmark classes of materials for fan and compressor blades in commercial airline engines. One reason for the materials being so broadly adopted is that regulations require an engine in commercial service to be capable of ingesting birds while allowing for continued operation or safe and orderly shutdown of that engine. Another reason is that blades must resist cracking from nicks and dents caused by small debris such as sand and rain. Engines with titanium fan blades as well as certain reinforced fiber composite fan blades with adhesively bonded metallic leading edge sheaths are the most common blades used to meet these criteria.

While titanium blades are relatively strong, they are heavy and expensive to manufacture. Composite blades offer sufficient strength and a significant weight savings over titanium, but they are expensive to process. Further, due to their relatively low strain tolerance, composite blades require a greater thickness than otherwise equivalent metal blades to meet bird strike requirements. Greater blade thickness reduces fan efficiency and offsets a significant portion of weight savings from using composite materials.

Blades made of aluminum or aluminum alloy can result in significant weight savings. However, aluminum alloy blades are softer and lower in strength than past titanium or composite blades. Aluminum blades are particularly susceptible to erosion and corrosion, particularly when it is in contact with a dissimilar metal, such as a titanium sheath or fan hub. Corrosion or erosion can lead to crack initiation which could result in failure of the aluminum blade. Aluminum blades are also prone to pitting from foreign object damage and sand erosion. This pitting can impart a local stress concentration and reduced fatigue capability of the aluminum alloy. A leading edge sheath made of titanium or nickel can give the aluminum blade added protection without significantly increasing the weight.

SUMMARY

An airfoil includes an airfoil body made of a first metal with a leading edge, a trailing edge, pressure side and suction side; a sheath with first and second flanks made of a second metal; a first layer of non-conductive material adhesively bonded between a portion of the end of the first flank and the airfoil body and extending beyond the end of the first flank on the pressure side; and a second layer of non-conductive material adhesively bonded between a portion of the end of the second flank and the airfoil body and extending beyond the end of the second flank on the suction side.

A method for assembling an airfoil of a first metal with a pressure side and a suction side with a sheath of a second metal with flanks includes applying a first adhesive to a first side of a first non-conductive shim; connecting the first side of the first non-conductive shim with first adhesive to the pressure side of the airfoil; applying a second adhesive to a first side of a second non-conductive shim; connecting the first side of the second non-conductive shim with the second adhesive to the suction side of the airfoil; applying a third adhesive to an inside of the sheath; and connecting the inside of the sheath with the third adhesive to the airfoil with non-conductive shims.

DETAILED DESCRIPTION

Figure 1:
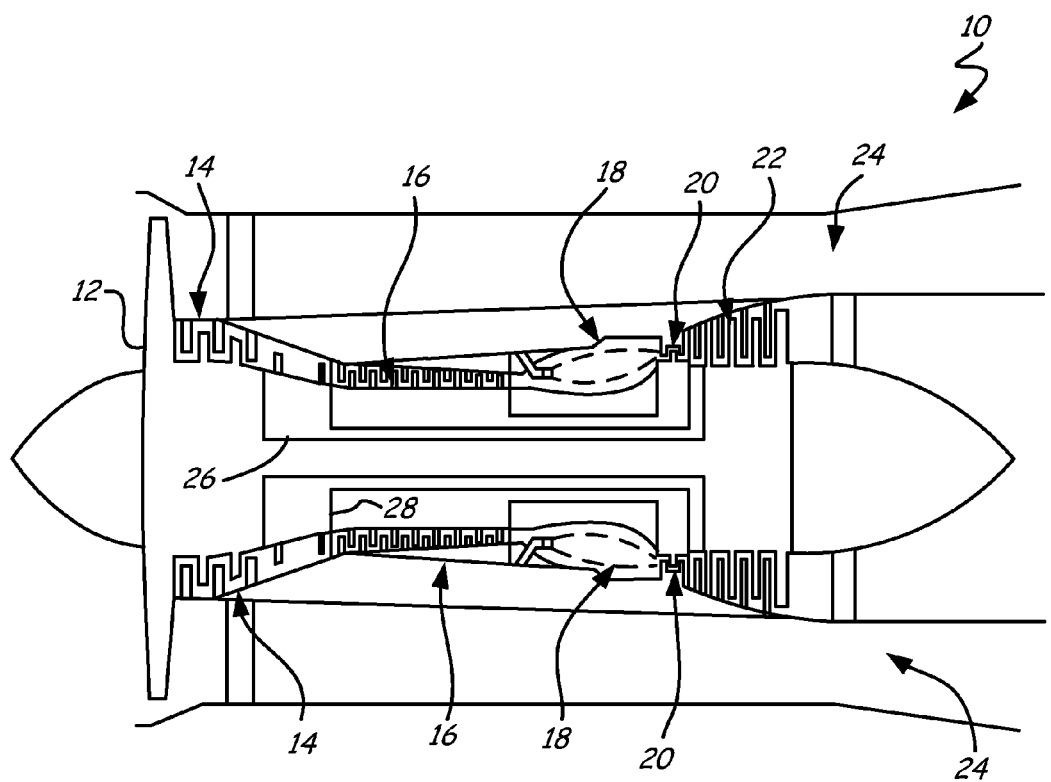
FIG. 1 schematically depicts a cross-section of a turbofan engine.

FIG. 1 shows an example of a dual-spool turbofan engine. Turbofan engine 10 comprises several sections: fan section 12, low-pressure compressor section 14, high-pressure compressor section 16, combustor section 18, high-pressure turbine section 20, low-pressure turbine section 22, bypass section 24, low-pressure shaft 26, and high-pressure shaft 28. A portion of the atmospheric air pulled in by rotation of fan section 12 is directed toward low-pressure compressor section 14, while the remainder is directed toward bypass section 24.

Air directed through low-pressure compressor section 14 is further compressed by high-pressure compressor section 16. Fuel is added and ignited in combustor section 18. Blades in turbine sections 20 and 22 capture a portion of the energy from passing combustion products by turning turbine rotors. Both fan section 12 and low-pressure compressor section 14 are rotatably linked via low-pressure shaft 26 to low-pressure power turbine section 22. High-pressure compressor section 16 is rotatably connected to high-pressure turbine section 22 via high-pressure shaft 28. Thrust is generated in engine 10 by the force of the air drawn in by fan section 12 and pushed through bypass section 24 (less any bleed air used for other aircraft functions), and by the force of exhaust gases exiting from low-pressure turbine section 22.

Being designed to pull vast quantities of air through bypass section 24 to generate thrust, blades in fan section 12 are the first line of defense for engine 10 and are highly susceptible to both small and large scale damage from the extreme conditions of engines as well as objects pulled in with the surrounding air. Small scale blade damage through pitting, erosion, corrosion or cracking causes performance deterioration and increases the number of potential crack initiation sites, while large scale damage includes blade deformation and failure. Small impacts can lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Aluminum alloy blades with a titanium leading edge sheath can be used as a lighter-weight alternative to titanium and composite blades. However, the susceptibility of aluminum alloys to corrosion, especially when bonded to a titanium sheath (yielding a large galvanic potential), results in the need for a galvanic corrosion preventive shim (see FIG. 2B) to ensure that blade 30 is able to resist corrosion, crack initiation and potential failure.

Blade 30 can be adapted for use in example dual-spool engine 10 shown in FIG. 1. In addition, the example blades described below can also be readily adapted for various engine configurations, including engines having any number of spools, such as engines with single spool or three-spool construction and engines that include a gearbox that transmits drive from a spool to the fan blade.

Figure 2A:
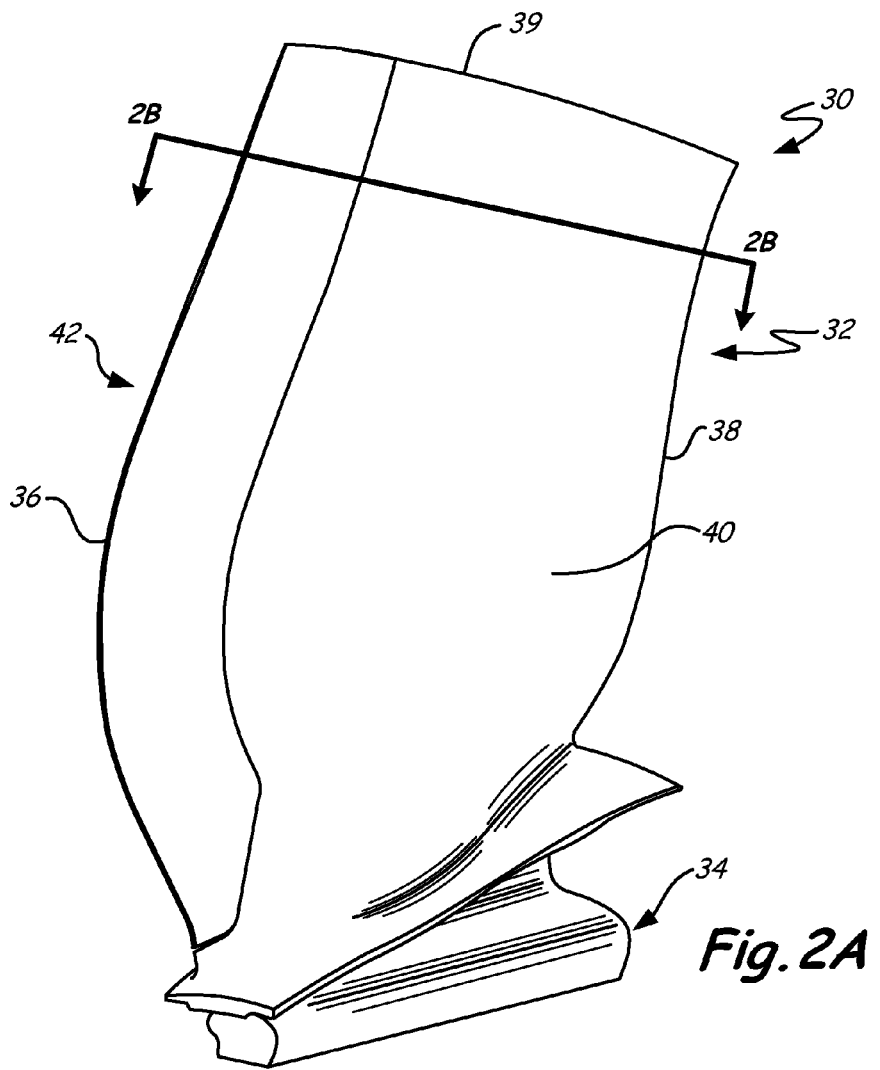
FIG. 2A shows a view of a blade and sheath.
Figure 2B:
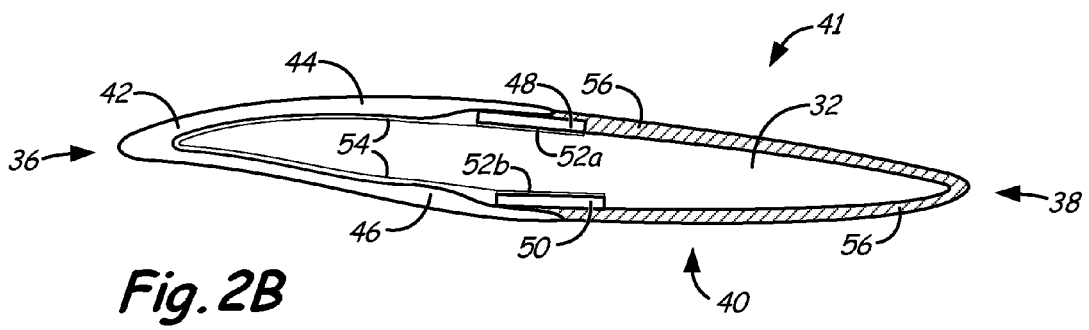
FIG. 2B shows a cross-sectional view of the blade of FIG. 2A.

FIG. 2A shows a view of blade 30 and sheath 42, and FIG. 2B shows a cross-sectional view of blade 30. Blade 30 includes airfoil body 32, root 34, leading edge 36, trailing edge 38, tip 39, suction surface 40, pressure surface 41, sheath 42 (with first flank 44 and second flank 46), first fiberglass shim 48, second fiberglass shim 50, adhesive 52a, 52b, 54 and erosion coating 56. Root 34 fits into a disc (not shown) to rotate blade 30 within fan section 12.

Sheath 36 can be a titanium (including alloys) or other material with sufficient strength to protect blade 30 in engine 10 when engine 10 is in operation. Airfoil body 32 and root 34 can be aluminum (including alloys) or a similar lightweight material to provide a lightweight blade without a complicated and expensive manufacturing process.

Adhesives 52a, 52b, 54 can include a scrim sheet and can be one of a variety of commercially available aerospace-quality metal-bonding adhesives, including several epoxy- and polyurethane-based adhesive films. Adhesives 52a, 52b, 54 can be the same adhesives or can be different depending on system requirements. Scrim sheet can be embedded into adhesive and provides dielectric separation between airfoil 32 and sheath 42, preventing galvanic corrosion between the two different metal surfaces of airfoil and sheath. The material forming scrim sheet is often determined by its compatibility with adhesive, and can be, for example, a flexible nylon-based layer with a thickness between about 0.002 inch (0.051 mm) and about 0.005 inch (0.127 mm) thick, with a nominal thickness of about 0.004 inches (0.102 mm).

In the example shown, airfoil body 32 has a thickness of about 0.150 inches (3.81 mm), first and second adhesives 52a, 52b have a thickness of about 0.005 inches (0.127 mm)-0.008 inches (0.203 mm), fiberglass shims 48, 50 each have a thickness of about 0.004 inches (0.102 mm)-0.006 inches (0.152 mm) and ends of sheath 42 flanks 44, 46 each have a thickness of about 0.020 inches (0.508 mm). Other embodiments could have different dimensions.

First fiberglass shim 48 is connected to pressure side 41 of airfoil 32 with adhesive 52a. Second fiberglass shim 50 is connected to suction side 40 of airfoil 32 with adhesive 52b. Fiberglass shims 48, 50 are pre-cured. While shims 48, 50 are stated to be fiberglass, they can be other non-conductive materials to separate aluminum airfoil body 32 and titanium sheath 42.

Sheath 42 is connected to airfoil and fiberglass shims 48, 50 with adhesive 54. Erosion coating 56 protects and covers portions of airfoil body 32 and fiberglass shims 48, 50 not covered by sheath 42.

Fiberglass shims 48, 50 protect blade from corrosion damage due to contact of dissimilar metals of sheath 42 and airfoil body 32. When forming blade 30, it is often put through a number of finishing operations, including heat treatment and media blasting to prepare for erosion coating 56. In past blades, this surface treatment could erode scrim sheet and/or adhesive at the end of flanks 44, 46, leaving portions of airfoil body 32 near ends of flanks 44, 46 susceptible to corrosion. As mentioned above, joining titanium sheath 42 to aluminum airfoil body 32 yields a large galvanic potential between the metals. As titanium is more "noble," aluminum airfoil body 32 may be prone to corrosion if connected to the titanium directly or through moisture. Inserting pre-cured fiberglass shims 48, 50 prevents the connection of sheath 42 to airfoil body 32 at the ends of flanks, where corrosion is most likely. Using pre-cured shims 48, 50 provides a robust barrier of a known thickness to prevent galvanic corrosion. Shims 48, 50 can withstand media blasting often used in finishing processes and can keep aluminum airfoil 32 separate from titanium sheath 42 even in situations where erosion coating 56 has been compromised through blade 30 use, thereby minimizing the potential for galvanic corrosion.

Figure 3:
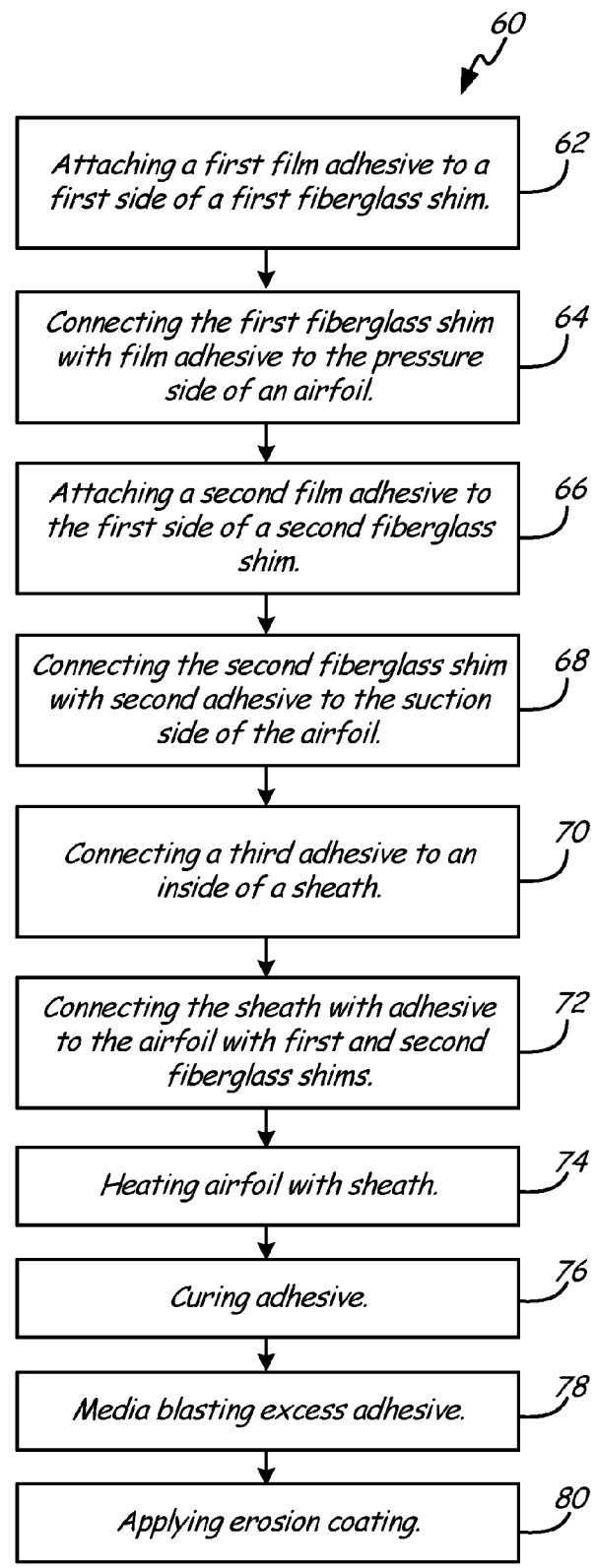
FIG. 3 shows a block diagram of a method of assembling the fan blade of FIG. 2A.

FIG. 3 shows a block diagram of a method of assembling fan blade 30. Method 60 includes applying a first film adhesive to a first side of a first fiberglass shim (step 62), connecting the first fiberglass shim with film adhesive to the pressure side of an airfoil (step 64), applying a second film adhesive to a first side of a second fiberglass shim (step 66), connecting the second fiberglass shim with second adhesive to the suction side of the airfoil (step 68), applying a third adhesive to an inside of a sheath (step 70), connecting the sheath with adhesive to the airfoil with first and second fiberglass shims (step 72), heating airfoil with sheath (step 74), curing adhesives (step 76), media blasting excess adhesive (step 78) and applying erosion coating (step 80).

Applying a first film adhesive to a first side of a first fiberglass shim (step 62) and applying a second film adhesive to a first side of a second fiberglass shim (step 66) can be done using a film adhesive the same size as the first and second fiberglass shims. Connecting the first fiberglass shim with film adhesive to the pressure side of an airfoil (step 64) and the second fiberglass shim with second adhesive to the suction side of the airfoil (step 68) is done so that first fiberglass shim 48 and second fiberglass shim 50 are connected to airfoil 32 so that where ends of flanks 44, 46 will fall on pressure side 41 and suction side 40.

Applying a third adhesive 54 to an inside of a sheath (step 70) can be done using a film adhesive with a scrim sheet. First, second and third adhesives 52a, 52b, 54 can be the same type of adhesive or can be different types of adhesives. Sheath 42 with third adhesive 54 connects to airfoil 32, with a portion first and second fiberglass shims under flanks 44, 46 and a portion of shims 48, 50 extending beyond flanks 44, 46 (steps 72). This helps to ensure titanium sheath 42 does not contact aluminum airfoil 32, thereby preventing galvanic corrosion.

Next, airfoil 32 with sheath 42 is heated (step 74) and adhesives are cured to increase the bond strength (step 76). This can be done in an autoclave which applies pressure to properly seat sheath 42 onto airfoil 32.

Finally, sheath 42 and airfoil 32 can be media blasted to remove excess adhesive (step 78) in preparation for applying erosion coating (step 80). Fiberglass shims 48, 50 have a thickness such that they can withstand the media blasting, ensuring sheath 42 does not contact airfoil 32 at the ends of flanks 44, 46. Erosion coating can be applied to all parts of airfoil 32 and fiberglass shims 48, 50 not covered by sheath 42. This can help prevent moisture from reaching airfoil 32.

Method 60 for assembling fan blade 30 helps to protect aluminum and aluminum alloy blades with titanium sheaths against their susceptibility to corrosion and erosion which can lead to reduced fatigue capability, especially at the ends of sheath 42 flanks 44, 46. This protection makes the use of the desirable light-weight aluminum alloy blade with a protective titanium sheath possible.

In summary, blade 30 with non-conductive fiberglass shims 48, 50 protect airfoil 32 in areas especially susceptible to galvanic corrosion. Fiberglass shims 48, 50 connect at the ends of sheath 42 flanks 44, 46 and extend beyond the ends of flanks, providing a solid barrier between aluminum airfoil 32 and titanic sheath 42. This prevents galvanic corrosion should erosion coating 56 be compromised. The system allows for use of lightweight aluminum airfoil 32 with high strength titanium sheath 42.

The above examples of the relative sizes of the components of blade 30 is included for illustrative purposes only and can readily be adapted by one skilled in the art for a variety of engine and blade designs. The dimensions of sheath 42, airfoil 32, adhesives 52a, 52b, 54, shims 48, 50 and erosion coating 56 are for example purposes only and can vary depending on a number of factors, including the size and shape of blade 30. The size and shape of blade 30 depend on the size and operating envelope of engine 10, which is itself often selected by the purchaser or end user of an aircraft utilizing engine 10. The discussion of blade as made of aluminum includes aluminum alloys. Similarly, the use of titanium in sheaths includes the use of alloys.

An airfoil includes an airfoil body made of a first metal with a leading edge, trailing edge, pressure side and suction side; a sheath with first and second flanks made of a second metal; and a first layer of non-conductive material adhesively bonded between a portion of the end of the first flank and the airfoil body and extending beyond the end of the first flank on the pressure side; and a second layer of non-conductive material adhesively between a portion of the end of the second flank and the airfoil body and extending beyond the end of the second flank on the suction side.

Additional and/or alternative embodiments include the first layer of non-conductive material being fiberglass; the second layer of non-conductive material being fiberglass; the first layer of non-conductive material and the second layer of non-conductive material being positioned to separate the airfoil body from the sheath; an adhesive layer connecting the sheath to the non-conductive layers and the airfoil body; the adhesive layer including a scrim sheet; the first metal being aluminum; the second metal being titanium; the first non-conductive layer and the second non-conductive layers being pre-cured; and/or the airfoil being a fan blade.

A method for assembling an airfoil of a first metal with a pressure side and a suction side with a sheath of a second metal with flanks includes applying a first adhesive to a first side of a first non-conductive shim; connecting the first side of the first non-conductive shim with first adhesive to the pressure side of the airfoil; applying a second adhesive to a first side of a second non-conductive shim; connecting the first side of the second non-conductive shim with the second adhesive to the suction side of the airfoil; applying a third adhesive to an inside of the sheath; and connecting the inside of the sheath with the third adhesive to the airfoil with non-conductive shims.

Additional and/or alternative embodiments include heating the airfoil and sheath; curing adhesives; media blasting excessive adhesive; applying an erosion coating to portions of the airfoil and the first and second non-conductive shims; the first and second non-conductive shims being fiberglass shims; the first non-conductive shim and the second non-conductive shim connecting to the airfoil where the sheath flanks end; the first and the second fiberglass shims extending on the pressure side and suction side of the airfoil beyond where the sheath flanks end; and/or the first metal being aluminum and the second metal being titanium.

A blade includes an aluminum airfoil with a suction side, a pressure side, a leading edge and a trailing edge; a sheath to connect to the leading edge with a first flank to connect to the pressure side and a second flank to connect to the suction side; a first fiberglass shim connecting between the sheath and the airfoil on the pressure side around where the first flank ends to separate the airfoil from the sheath; a second fiberglass shim connecting between the sheath and the airfoil on the suction side around where the second flank ends to separate the airfoil from the sheath; and an erosion coating on the pressure side and the suction side of the airfoil extending from the end of each flank to the trailing edge over a portion of the first fiberglass shim and the second fiberglass shim.

Additional and/or alternative embodiments include the first fiberglass shim and the second fiberglass shim being precured.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:
    an airfoil body made of a first material with a leading edge, trailing edge, pressure side and suction side;
    a sheath with first and second flanks made of a second material;
    a first shim disposed between a portion of an end of the first flank and the airfoil body and extending beyond the end of the first flank on the pressure side;
    a first adhesive layer disposed between the first shim and the airfoil and connecting the first shim to the airfoil;
    a second shim disposed between a portion of an end of the second flank and the airfoil body and extending beyond the end of the second flank on the suction side; and
    a second adhesive layer disposed between the second shim and the airfoil and connecting the second shim to the airfoil.

2. The airfoil of claim 1, wherein the first shim is fiberglass.

3. The airfoil of claim 2, wherein the second shim is fiberglass.

4. The airfoil of claim 1, wherein the first shim and the second shim are positioned to separate the airfoil body from the sheath.

5. The airfoil of claim 4, and further comprising:
    a third adhesive layer connecting the sheath to the first shim, the second shim, and the airfoil body.

6. The airfoil of claim 5, wherein the third adhesive layer includes a scrim sheet.

7. The airfoil of claim 1, wherein the first material is aluminum.

8. The airfoil of claim 1, wherein the second material is titanium.

9. The airfoil of claim 1, wherein the first shim and the second shim are pre-cured.

10. The airfoil of claim 1, wherein the airfoil is a fan blade.

11. A method for assembling an airfoil of a first material with a pressure side and a suction side with a sheath of a second material with flanks, the method comprising:
    applying a first adhesive to a first side of a first non-conductive shim;
    connecting the first side of the first non-conductive shim with first adhesive to the pressure side of the airfoil;
    applying a second adhesive to a first side of a second non-conductive shim;
    connecting the first side of the second non-conductive shim with the second adhesive to the suction side of the airfoil;
    applying a third adhesive to an inside of the sheath; and
    connecting the inside of the sheath with the third adhesive to the airfoil with non-conductive shims.

12. The method of claim 11, and further comprising:
    heating the airfoil and sheath.

13. The method of claim 12, and further comprising:
    curing the adhesives.

14. The method of claim 13, and further comprising:
    media blasting excessive adhesive; and
    applying an erosion coating to portions of the airfoil and the first and second non-conductive shims.

15. The method of claim 11, wherein the first and second non-conductive shims are fiberglass shims.

16. The method of claim 11, wherein the first non-conductive shim and the second non-conductive shim connect to the airfoil where the sheath flanks end.

17. The method of claim 16, wherein the first and second non-conductive shims extend on the pressure side and suction side of the airfoil beyond where the sheath flanks end.

18. The method of claim 11, wherein the first material is aluminum and the second material is titanium.

19. A blade comprising:
    an airfoil with a suction side, a pressure side, a leading edge and a trailing edge;
    a sheath to connect to the leading edge with a first flank to connect to the pressure side and a second flank to connect to the suction side;
    a first fiberglass shim disposed between the sheath and the airfoil on the pressure side around where the first flank ends to separate the airfoil from the sheath;
    a first adhesive layer disposed between the first fiberglass shim and the airfoil and connecting the first fiberglass shim to the airfoil;
    a second fiberglass shim disposed between the sheath and the airfoil on the suction side around where the second flank ends to separate the airfoil from the sheath;
    a second adhesive layer disposed between the second fiberglass shim and the airfoil and connecting the second fiberglass shim to the airfoil;
    a third adhesive layer disposed between the sheath and the airfoil and connecting the sheath to the airfoil; and
    an erosion coating on the pressure side and the suction side of the airfoil extending from the end of each flank to the trailing edge over a portion of the first fiberglass shim and the second fiberglass shim.

20. The blade of claim 19, wherein the first fiberglass shim and the second fiberglass shim are precured.

* * * * *